US012690116B2

(12) United States Patent
Van De Sluis et al.

(10) Patent No.: US 12,690,116 B2
(45) Date of Patent: Jul. 21, 2026

(54) USER INTERFACE DEVICE FOR CONTROLLING REORIENTABLE LIGHTING DEVICES

(71) Applicant: SIGNIFY HOLDING B.V., Eindhoven (NL)

(72) Inventors: Bartel Marinus Van De Sluis, Eindhoven (NL); Marcellinus Petrus Carolus Michael Krijn, Eindhoven (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 37 days.

(21) Appl. No.: 18/874,807

(22) PCT Filed: Jun. 8, 2023

(86) PCT No.: PCT/EP2023/065367
§ 371 (c)(1),
(2) Date: Dec. 13, 2024

(87) PCT Pub. No.: WO2023/242048
PCT Pub. Date: Dec. 21, 2023

(65) Prior Publication Data
US 2025/0365840 A1 Nov. 27, 2025

(30) Foreign Application Priority Data
Jun. 14, 2022 (EP) .................................... 22178822

(51) Int. Cl.
*H05B 47/175* (2020.01)
*F21V 21/15* (2006.01)
(Continued)

(52) U.S. Cl.
CPC ......... *H05B 47/1965* (2024.01); *F21V 21/15* (2013.01); *F21V 23/0435* (2013.01); *H05B 47/115* (2020.01); *H05B 47/155* (2020.01)

(58) Field of Classification Search
CPC .... H05B 47/19; H05B 47/11; H05B 47/1965; H05B 47/115; H05B 47/105;
(Continued)

(56) References Cited

U.S. PATENT DOCUMENTS

2012/0293075 A1 11/2012 Engelen et al.
2018/0035513 A1 * 2/2018 Magielse .............. H05B 47/19
(Continued)

FOREIGN PATENT DOCUMENTS

WO 2013088394 A2 6/2013
WO 2017021088 A1 2/2017
(Continued)

*Primary Examiner* — Wei (Victor) Y Chan

(57) ABSTRACT

A user interface device for use in a lighting system is disclosed. The lighting system comprises a plurality of lighting devices, each lighting device being repositionable by a user, and each lighting device comprising a motion sensor configured to detect a motion of the respective lighting device. The user interface device comprises: a display, a receiver configured to receive one or more input signals indicative of motions of lighting devices of the plurality of repositionable lighting devices, and a processor configured to: determine which lighting device has been most recently repositioned based on the one or more input signals, render a plurality of virtual representations of the plurality of lighting devices on the display, and render an indication on the display indicating the lighting device that has been most recently repositioned.

14 Claims, 5 Drawing Sheets

(51) Int. Cl.

| | |
|---|---|
| ***F21V 23/04*** | (2006.01) |
| ***H05B 47/115*** | (2020.01) |
| ***H05B 47/155*** | (2020.01) |

(58) Field of Classification Search
CPC .......................... H05B 47/1985; H05B 47/16; H05B 47/1975; H05B 47/196; H05B 45/12; H05B 45/20
See application file for complete search history.

(56) References Cited

U.S. PATENT DOCUMENTS

| | | | | |
|---|---|---|---|---|
| 2018/0255625 | A1 | 9/2018 | Lashina et al. | |
| 2019/0132928 | A1 | 5/2019 | Rodinger et al. | |
| 2020/0020057 | A1* | 1/2020 | Pandharipande ............................ | G06Q 10/06315 |
| 2021/0243872 | A1* | 8/2021 | Heemstra ............... | H05B 47/19 |

FOREIGN PATENT DOCUMENTS

| | | | |
|---|---|---|---|
| WO | 2017186532 | A1 | 11/2017 |
| WO | 2021249938 | A1 | 12/2021 |

* cited by examiner

500

USER INTERFACE DEVICE FOR CONTROLLING REORIENTABLE LIGHTING DEVICES

CROSS-REFERENCE TO PRIOR APPLICATIONS

This application is the U.S. National Phase application under 35 U.S.C. § 371 of International Application No. PCT/EP2023/065367, filed on Jun. 8, 2023, which claims the benefit of European Patent Application 22178822.7, filed on Jun. 14, 2022. These applications are hereby incorporated by reference herein.

FIELD OF THE INVENTION

The invention relates to a user interface device for use in a lighting system. The invention further relates to a lighting system comprising the user interface device. The invention further relates to a method of providing a user interface on a user interface device, and to a computer program product for executing the method.

BACKGROUND

Home and professional environments may contain a large number of lighting devices for creation of ambient, atmosphere, accent or task lighting. These lighting devices may be controlled via a (wireless) network, for example by a smart device such as a smartphone or a (central) control panel. Such user interface devices typically comprise a display that shows the controllable lighting devices.

Certain types of lighting devices, such as spotlights or table lamps, are directable by the user. A user may change the orientation manually by simply reorienting a lighting device. Other types of lighting devices, such as table lamps or portable lamps, or (spot) lights in a power track system, may be repositioned by a user.

SUMMARY OF THE INVENTION

The inventors have realized that when a lighting system has multiple lighting devices, the user interface of the user interface device may be come cluttered, and it may be difficult for the user to identify a certain lighting device. The inventors have also realized that may be beneficial-especially for repositionable lighting devices—to indicate on the user interface which lighting device has been recently repositioned (e.g. moved or reoriented). This enables a user to immediately see with which lighting device the user has interacted, thereby reducing the time for the user to find a lighting device on the user interface, and thereby improving the user experience of controlling lighting devices of a lighting system comprising a plurality of lighting devices. It is therefore an object to improve the user experience of controlling lighting devices of a lighting system comprising a plurality of lighting devices.

According to a first aspect, the object is achieved by a user interface device for use in a lighting system comprising a plurality of lighting devices, each lighting device being repositionable by a user, and each lighting device comprising a motion sensor configured to detect a motion of the respective lighting device, the user interface device comprising:

a display, a receiver configured to receive one or more input signals indicative of motions of lighting devices of the plurality of repositionable lighting devices, a processor configured to:

determine which lighting device has been most recently repositioned based on the one or more input signals, render a plurality of virtual representations of the plurality of lighting devices on the display, and render an indication on the display indicating the lighting device that has been most recently repositioned.

The processor is configured to determine which lighting device has been most recently repositioned based on the one or more input signals. The one or more input signals may be indicative of a time at which the lighting device(s) have been repositioned or touched. For instance, the one or more input signals may comprise data indicative of the time at which the lighting device(s) have been repositioned, or the processor may be configured to determine at which moment in time the one or more input signals have been received. The processor is further configured to render a plurality of virtual representations of the plurality of lighting devices on the display and an indication indicating the lighting device that has been most recently repositioned. This is beneficial, because the user can immediately see with which lighting device the user has most recently interacted. This reduces the time for the user to find the lighting device on the user interface, and it improves the user experience of controlling the lighting device.

The motion sensor may be configured to detect a movement of a respective lighting device, and the processor may be configured to determine which lighting device has been moved most recently based on the one or more input signals. The movement may, for example, be a touch movement of the user, or a change of the location or orientation of the lighting device by the user. This is beneficial, because the user can immediately see which lighting device the user has most recently moved. Additionally or alternatively, the motion sensor may be configured to detect an orientation of a respective lighting device, and the processor may be configured to determine which lighting device has been reoriented most recently based on the one or more input signals. A user may reorient the lighting device, and this may be detected with the motion sensor. This is beneficial, because the user can immediately see which lighting device the user has most recently reoriented.

The processor may be configured to receive a user input from the user via a user interface, and control the lighting device that has been repositioned most recently based on the user input. This is beneficial, because it enables the user to immediately control the lighting device that has been repositioned most recently, thereby reducing the time for the user to control the lighting device via the user interface and further improving the user experience of controlling the lighting device.

The processor may be configured to determine when the plurality of lighting devices have been repositioned based on the one or more input signals, render a list of the plurality of virtual representations of the plurality of lighting devices on the display and determine the order of the list as a function of when the plurality of lighting devices have been repositioned. The plurality of virtual representations of the plurality of lighting devices may be ordered from most recently repositioned to least recently repositioned.

The processor may be configured to determine when the plurality of lighting devices have been repositioned based on the one or more input signals, and to group the plurality of lighting devices into one or more groups based on when the plurality of lighting devices have been repositioned. The processor may for example be configured to select a subset of lighting devices of the plurality of lighting devices that have been repositioned at during a (first, predefined) time period, and group the subset of lighting devices into a group.

Additionally, the processor may for be configured to select a second subset of lighting devices of the plurality of lighting devices that have been repositioned during a second time period, and group the second subset of lighting devices into a second group. This is beneficial, because the lighting devices are grouped automatically.

The processor may be further configured to render a virtual representation of the group(s) on the display.

Additionally or alternatively, the processor may be configured to obtain location information indicative of the locations of the plurality of lighting devices, and group the plurality of lighting devices into the one or more groups further based on the locations of the plurality of lighting devices. The processor may, for example, group lighting devices located within a predefined proximity in the same group.

The processor may be configured to determine a light setting for controlling the lighting device that has been most recently repositioned, and control the lighting device according to the light setting after the lighting device has been repositioned, wherein the light setting is different from light settings of other lighting devices or wherein the light setting is a predefined light setting. This is beneficial, because the lighting device indicates that it is the most recently repositioned lighting device.

According to a second aspect, the object is achieved by a lighting system comprising:

- a plurality of lighting devices, each lighting device being repositionable by a user, and each lighting device comprising a motion sensor configured to detect a motion of a respective lighting device, and
- the user interface device according to any of the above-mentioned user interface devices. The plurality of lighting devices may be comprised in a luminaire (e.g. a ceiling-mounted luminaire comprising reorientable spots). The plurality of lighting devices may be arranged along a longitudinal axis of the luminaire (e.g. a luminaire or power track comprising a plurality of linearly positioned light sources along a central axis).

According to a third aspect, the object is achieved by a method of providing a user interface on a user interface device, the user interface device for use in a lighting system comprising a plurality of lighting devices, each lighting device being repositionable by a user, and each lighting device comprising a motion sensor configured to detect a motion of the respective lighting device, the method comprising:

- receiving one or more input signals indicative of motions of lighting devices of the plurality of repositionable lighting devices,
- determining which lighting device has been most recently repositioned based on the one or more input signals,
- rendering a plurality of virtual representations of the plurality of repositionable lighting devices on a display, and
- rendering an indication on the display indicating the lighting device that has been most recently repositioned.

According to a fourth aspect, the object is achieved by a computer program product for a computing device, the computer program product comprising computer program code to perform the method when the computer program product is run on a processing unit of the computing device.

It should be understood that the lighting system, method and computer program product may have similar and/or identical embodiments and advantages as the above-mentioned user interface devices.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
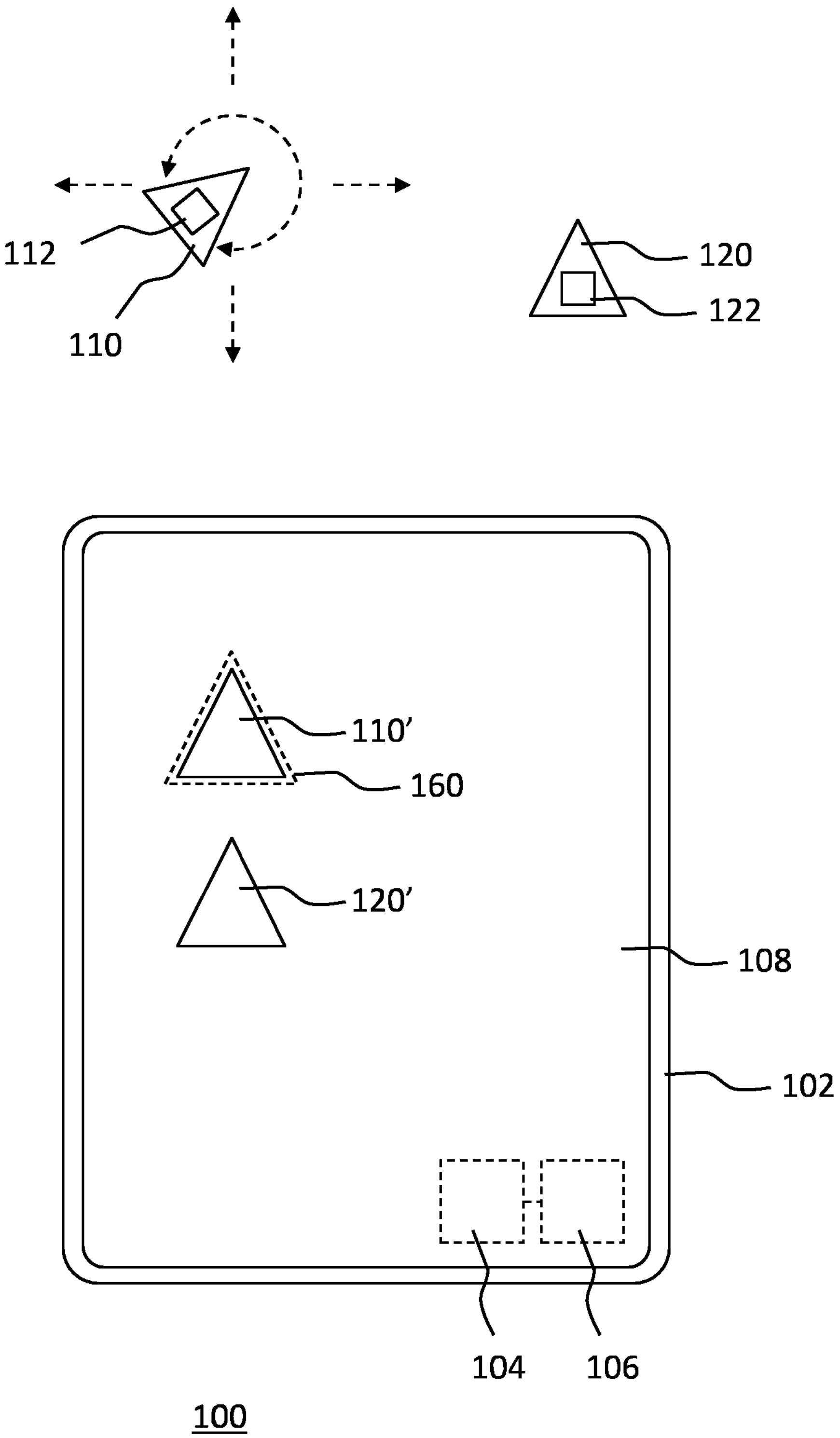
FIG. 1 shows schematically an example of a lighting system comprising a plurality of lighting devices and a user interface device.

FIG. 1 shows schematically an example of a lighting system 100 comprising a plurality of lighting devices 110, 120 and a user interface device 102. The lighting devices 110, 120 are repositionable by a user (not shown). The user may, for example, move or reorient the lighting devices 110, 120. Each lighting device 110, 120 comprises a respective motion sensor 112, 122 configured to detect a motion of the respective lighting device 110, 120. The user interface device 102 comprises a display 108, a receiver 104 and a processor 106. The user interface device 102 may be any type of device configured to control or configure the lighting system 100. The user interface device 102 may be for example be a smartphone, a tablet pc, a pc, a central (home) lighting control system, etc.

The lighting devices 110, 120 are lighting devices that are repositionable by a user. The lighting devices 110, 120 may be for example be portable lighting devices that can be repositioned (moved) by a user and/or the lighting devices 110, 120 may be reorientable by a user. The lighting devices 110, 120 may, for example, be controlled by the processor 106 of the user interface device 102, by a central lighting control system (e.g. a bridge, a gateway, etc.), by another connected device, etc. The lighting devices 110, 120 may further comprise a communication unit (not shown) configured to receive lighting control commands (and, optionally, orientation control commands). The communication unit may comprise hardware for communicating via one or more wireless communication protocols, for example Bluetooth, Wi-Fi, Li-Fi, 3G, 4G, 5G or ZigBee. A specific communication technology may be selected based on the system architecture of the lighting system. The lighting devices 110, 120 may be any type of lighting device comprising one or more (LED) light sources, and a processing unit for controlling the light output (e.g. hue, saturation and/or brightness) of the one or more light sources based on received control signals. The lighting devices 110, 120 may be arranged for providing general lighting, such as task lighting, ambient lighting, atmosphere lighting, accent lighting, indoor lighting, outdoor lighting, etc.

Figure 2:
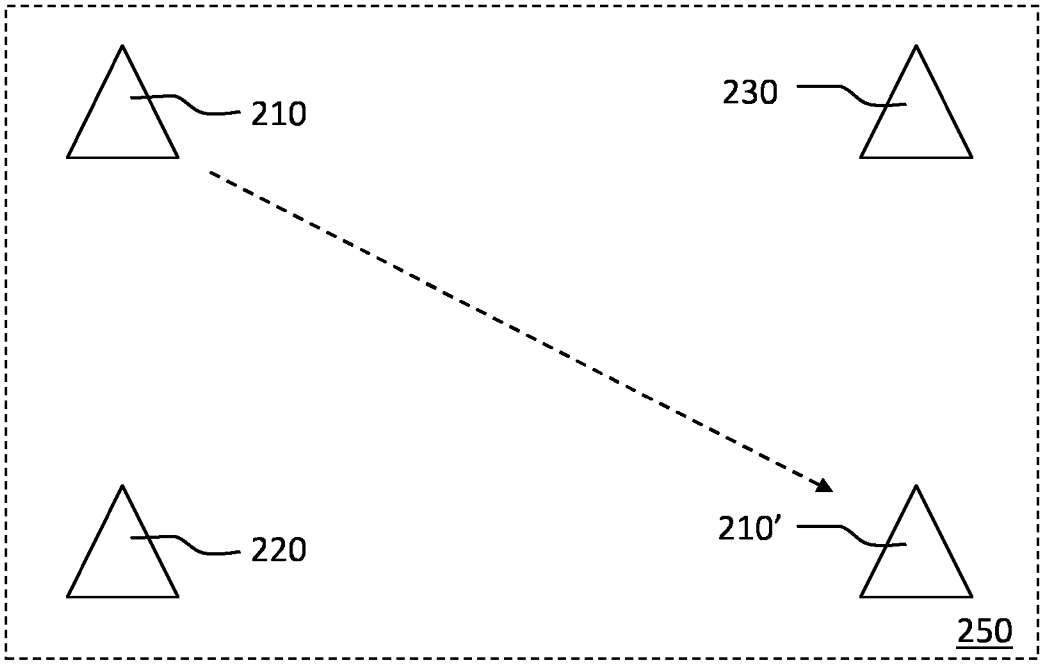
FIG. 2 shows schematically an example of a lighting system wherein a lighting device is moved in the environment.

The lighting devices 110, 120 may comprise a motion sensor 112, 122 configured to detect a motion of a respective lighting device 110, 112. The motion sensors 112, 122 may be configured to detect a movement of a respective lighting device, and to provide a signal to the user interface device 102 indicative of a movement of a respective lighting device 110, 120. The signal may be communicated to the user interface device 102 via a communication unit of the lighting device 110, 120. The motion sensors may comprise one or more sensors (such as one or more accelerometers, one or more gyroscopes, one or more magnetometers, one or more tilt sensors, etc.) in order to detect the motion of the lighting device 110, 120. The motion may be a repositioning of the lighting device 110, 120, a reorientation of the lighting device 110, 120, a touch of the lighting device 110, 120, etc. Such motion sensors are known in the art and will therefore not be discussed in further detail. FIG. 2 illustrates an example of a lighting system comprising a plurality of lighting devices 210, 220, 230. A user may move a lighting device 210 to a new location 210', which movement may be detected by a motion sensor of the lighting device 210. The lighting device 210 may then communicate one or more signals indicative of the movement of the lighting device 210 to the user interface device 102.

Additionally or alternatively, the motion sensors 112, 122 may be configured to detect a (re) orientation of a respective (reorientable) lighting device 110, 120. The lighting devices 110, 120 may comprises respective orientation sensors configured to provide a signal to the user interface device 102 indicative of the (re) orientation of a respective lighting device 110, 120. The orientation sensors may comprise one or more sensors (such as one or more accelerometers, one or more gyroscopes, one or more magnetometers, one or more tilt sensors, etc.) in order to detect the orientation of the lighting device 110, 120. The orientation of the lighting device 110, 120 may be defined by the roll, pitch and yaw of the lighting device 120 around X, Y and Z axes. Such orientation sensors are known in the art and will therefore not be discussed in further detail. Examples of manually reorientable lighting devices are shown in FIGS. 3*a*-3*c*.

Figure 3A:
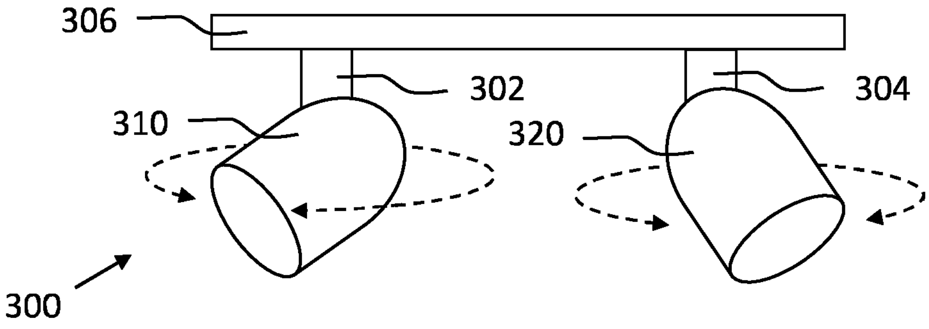
FIGS. 3*a*-3*c* show schematically examples of reorientable lighting devices.
Figure 3B:
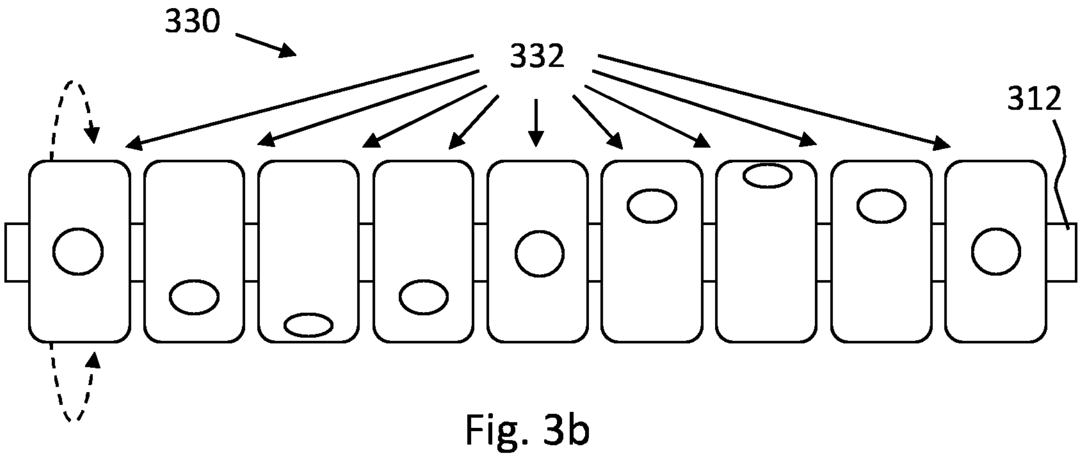
Figure 3C:
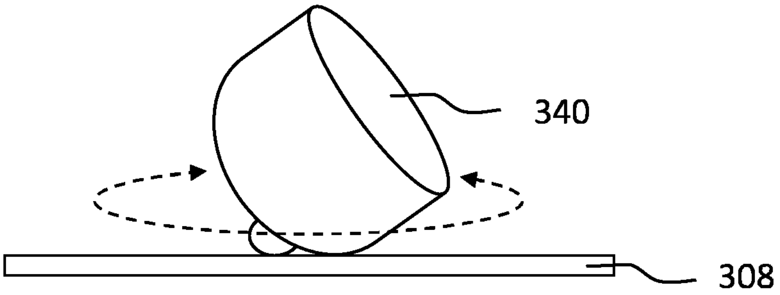

FIG. 3*a* shows an example of a luminaire 300 comprising a plurality of reorientable lighting devices 310, 320, each comprising an orientation sensor (not shown). The luminaire 300 comprises a base 306, and each lighting device 310, 320 is configured to be rotated about a respective axis 302, 304. The lighting devices 310, 320 may further be tiltable. FIG. 3*b* shows an alternative luminaire 330, wherein the luminaire comprises a plurality of lighting devices 332. The plurality of lighting devices 332 are arranged along a longitudinal axis 312 of the luminaire 330. The lighting devices 332 are rotatable along the longitudinal axis 312 of the luminaire 330. The lighting devices 332 may each comprise an orientation sensor configured to detect a reorientation of a respective lighting device. FIG. 3*b* shows an alternative reorientable lighting device 340. The lighting device 340, which comprises an orientation sensor, is placeable on a surface 308, and a user may change the orientation of the lighting device 340. The lighting device 340*v* may, for example, be a portable lighting device.

The user interface device 102 comprises a receiver 304 (a communication unit) configured to receive one or more input signals indicative of motions of lighting devices 110, 120 of the plurality of repositionable lighting devices 110, 120. The one or more input signals may be received from the lighting devices 110, 120 directly, or indirectly, for instance via an intermediary device such as a bridge, a gateway, a remote server, etc. The receiver 104 may comprise hardware for communicating via one or more communication protocols, for example Bluetooth, Wi-Fi, Li-Fi, 3G, 4G, 5G or ZigBee. The one or more input signals are indicative of motions of lighting devices. The one or more input signals may be generated by the lighting devices, and the lighting devices may communicate the signals to the user interface device 102. The one or more input signals may be transmitted by a lighting device when the lighting device is repositioned.

The user interface device 102 comprises a processor 106 (e.g. a microcontroller, circuitry, a microchip, etc.). The processor 106 is configured to determine which lighting device has been most recently repositioned based on the one or more input signals. The one or more input signals may be indicative of a time at which the lighting device(s) have been repositioned. For instance, the one or more input signals may comprise data indicative of the time at which the lighting device(s) have been repositioned, or the processor 106 may be configured to determine at which moment in time the one or more input signals have been received. The processor 106 is further configured to render a plurality of virtual representations 110', 120' (e.g. icons, device names, etc.) of the plurality of lighting devices 110, 120 on the display 108. The processor 106 is further configured to render an indication 160 on the display 108 indicating the lighting device 110' that has been most recently repositioned. In the example of FIG. 1, the indication 160 is shown as highlighting of the lighting device 110. It should be understood that this is merely an example, and that the skilled person is able to provide other indications to indicate which lighting device has been most recently repositioned. For instance, the processor 106 may be configured to change the color or size of the virtual representation, change the order of the list of virtual representations (e.g. by putting the lighting device that has been most recently repositioned on top), change the name of the lighting device, provide textual information indicating which lighting device that has been most recently repositioned, etc. In the example of FIG. 1, the user may have moved and/or reoriented lighting device 110. The lighting device 110 may communicate one or more signals indicative of this movement and/or reorientation to the user interface device 102. Based on these one or more signals, the processor 106 may determine that lighting device 110 has been repositioned most recently, and indicate this on the display 108 by rendering indication 160 at a virtual representation 110' of the lighting device 110.

The processor 106 may be configured to receive a user input from the user via a user interface and control the lighting device that has been repositioned most recently based on the user input. This enables a user to immediately control the lighting device 110 that has been repositioned most recently. The user may, for example, provide an input to change the hue, saturation or brightness of the most recently repositioned lighting device 110, or select a (dynamic) light scene for the most recently repositioned lighting device 110. The user interface may be the display, which may comprise a touch-sensitive surface. Alternatively, the user interface may be another user interface such as a voice interface, a rotary dimmer, a light switch, etc.

The processor 106 may be configured to determine when the plurality of lighting devices 110, 120 have been repositioned based on the one or more input signals and render a list of the plurality of virtual representations of the plurality of lighting devices on the display 108. The processor 106 may be configured to determine the order of the list as a function of when the plurality of lighting devices have been repositioned. The processor 106 may determine the order such that the virtual representations of the plurality of lighting devices are ordered from most recently repositioned to least recently repositioned. Referring to FIG. 1, the user may, for example, first reposition lighting device 120 and subsequently reposition lighting device 110. The lighting devices 120 may communicate signals indicative of these repositions to the user interface device 102, and the processor 106 may determine when the plurality of lighting devices 120, 110 have been repositioned based on the one or more input signals and render the list of the virtual representations accordingly (which in this example would result in virtual representation 110' preceding virtual representation 120').

Figure 4:
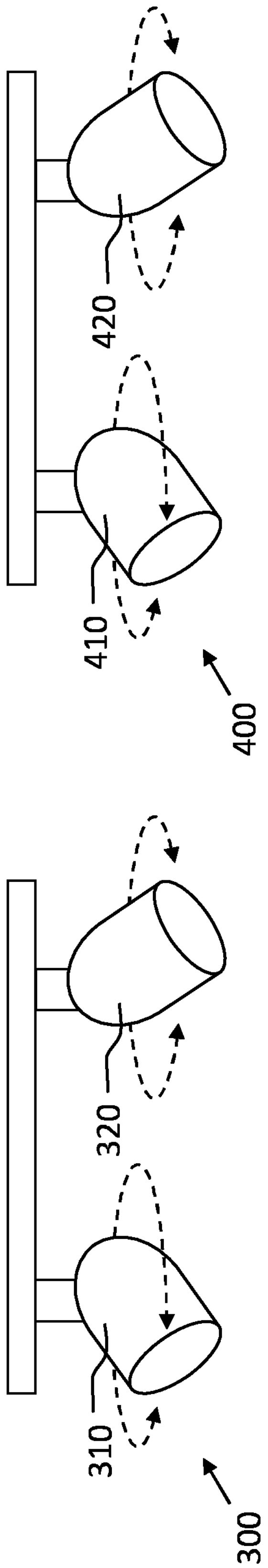
FIG. 4 shows schematically an example of a lighting system comprising a plurality of luminaires, each comprising a plurality of reorientable lighting devices.

The processor 106 may be configured to determine when the plurality of lighting devices 110, 120 have been repositioned based on the one or more input signals, and group the plurality of lighting devices 110, 120 into one or more groups based on when the plurality of lighting devices 110, 120 have been repositioned. The processor 106 may store the grouping information in a memory. The memory may be comprised in the user interface device 102, in a central (home) lighting controller, in the lighting devices 110, 120, etc. FIG. 4 illustrates an example thereof, wherein the lighting system comprising two luminaires 300, 400 according to the luminaire of FIG. 3*a*. A user may reorient lighting devices 310 and 320 of luminaire 300. Subsequently, the user may reorient lighting devices 410 and 420 of luminaire 400. The processor 106 may receive signals from the lighting devices 310, 320, 410, 420 indicative of the reorientations. Based on that lighting devices 310 and 320 have been reoriented first, and that lighting devices 410 and 420 have been reoriented subsequently, the processor 106 may group lighting devices 310 and 320 into a first lighting control group, and group lighting devices 410 and 420 into a second lighting control group.

The processor 106 may be configured to select a subset of lighting devices of the plurality of lighting devices 110, 120 that have been repositioned during a time period, and group the subset of lighting devices into a group. For instance, referring again to FIG. 4, if a user would reorient lighting devices 310 and 320 of luminaire 300 within a (predefined) time period, the processor 106 may group these lighting devices 310, 320 in a group.

The processor 106 may be further configured to obtain location information indicative of the locations of the plurality of lighting devices 110, 120, and to group the plurality of lighting devices 110, 120 into the one or more groups further based on the locations of the plurality of lighting devices 110, 120. The location information may for example be obtained from an (indoor) positioning system (e.g. an RF-based positioning system, a VLC-based positioning system, etc.). Alternatively, the location information may be obtained from a memory storing information about the locations of lighting devices of the lighting system. These locations may be obtained from the (indoor) positioning system, or for example via a user interface, wherein the user may provide input indicative of the locations via the user interface, for instance by positioning virtual representations (e.g. icons) of the lighting devices 110, 120 on a map of the environment. Techniques for determining locations of lighting devices are known in the art, and will therefore not be discussed in detail. For instance, referring again to FIG. 4, if a user would reorient lighting devices 310 and 320 of luminaire 300 and lighting devices 410 and 420 of luminaire 400 (e.g. within a time period), the processor 106 may group these lighting devices into two groups based on their locations; a first group comprising lighting devices 310 and 320, and a second group comprising lighting devices 410 and 420.

The processor 106 may be configured to determine a light setting for controlling the lighting device that has been most recently repositioned, and control the lighting device according to the light setting after the lighting device has been repositioned. The light setting may be a light setting that is different from light settings of other lighting devices. Alternatively, the light setting may be a predefined light setting. The processor 106 may control the lighting device that has been most recently repositioned according to the light setting to indicate to the user that that lighting device has been most recently repositioned. The processor 106 may control the lighting device has been most recently repositioned by transmitting a lighting control command to that lighting device, for example via a transmitter (not shown). For instance, referring to FIG. 1, the user may have repositioned (e.g. moved and/or reoriented) lighting device 110 most recently, and the processor 106 may control that lighting device 110 according to a certain light setting to indicate that that lighting device 110 has been repositioned.

Figure 5:
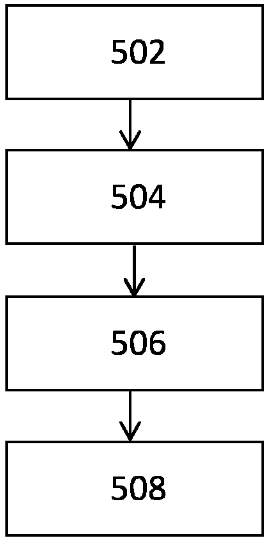
FIG. 5 shows schematically a method of providing a user interface on a user interface device.

FIG. 5 shows schematically a method 500 of providing a user interface on a user interface device. The user interface device for use in a lighting system comprising a plurality of lighting devices, each lighting device being repositionable by a user, and each lighting device comprising a motion sensor configured to detect a motion of the respective lighting device. The method 500 comprises:

- receiving 502 one or more input signals indicative of motions of lighting devices of the plurality of repositionable lighting devices,
- determining 504 which lighting device has been most recently repositioned based on the one or more input signals,
- rendering 506 a plurality of virtual representations of the plurality of repositionable lighting devices on a display, and
- rendering 508 an indication on the display indicating the lighting device that has been most recently repositioned.

The method 500 may be executed by computer program code of a computer program product when the computer program product is run on a processing unit of a computing device, such as the processor 106 of the user interface device 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb “comprise” and its conjugations does not exclude the presence of elements or steps other than those stated in a claim. The article “a” or “an” preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A user interface device for use in a lighting system comprising a plurality of lighting devices, each lighting device being repositionable by a user, and each lighting device comprising a motion sensor configured to detect a motion of the respective lighting device, the user interface device comprising:

a display, a receiver configured to receive one or more input signals indicative of motions of lighting devices of the plurality of repositionable lighting devices, a processor configured to:

determine which lighting device has been most recently repositioned based on the one or more input signals, render a plurality of virtual representations of the plurality of lighting devices on the display, and render an indication on the display indicating the lighting device that has been most recently repositioned.

2. The user interface device of claim 1, wherein the motion sensor is configured to detect a movement of a respective lighting device, and wherein the processor is configured to determine which lighting device has been moved most recently based on the one or more input signals.

3. The user interface device of claim 1, wherein the motion sensor is configured to detect an orientation of a respective lighting device, and wherein the processor is configured to determine which lighting device has been reoriented most recently based on the one or more input signals.

4. The user interface device of claim 1, wherein the processor is configured to receive a user input from the user via a user interface, and to control the lighting device that has been repositioned most recently based on the user input.

5. The user interface device of claim 1, wherein the processor is configured to determine when the plurality of lighting devices have been repositioned based on the one or more input signals, to render a list of the plurality of virtual representations of the plurality of lighting devices on the display and to determine the order of the list as a function of when the plurality of lighting devices have been repositioned.

6. The user interface device of claim 1, wherein the processor is configured to determine when the plurality of lighting devices have been repositioned based on the one or more input signals, and to group the plurality of lighting devices into one or more groups based on when the plurality of lighting devices have been repositioned.

7. The user interface device of claim 6, wherein the processor is configured to select a subset of lighting devices of the plurality of lighting devices that have been repositioned during a time period, and group the subset of lighting devices into a group.

8. The user interface device of claim 6, wherein the processor is further configured to obtain location information indicative of the locations of the plurality of lighting devices, and to group the plurality of lighting devices into the one or more groups further based on the locations of the plurality of lighting devices.

9. The user interface device of claim 1, wherein the processor is configured to determine a light setting for controlling the lighting device that has been most recently repositioned, and control the lighting device according to the light setting after the lighting device has been repositioned, wherein the light setting is different from light settings of other lighting devices or wherein the light setting is a predefined light setting.

10. A lighting system comprising:

a plurality of lighting devices, each lighting device being repositionable by a user, and each lighting device comprising a motion sensor configured to detect a motion of a respective lighting device, and the user interface device of claim 1.

11. The lighting system of claim 10, wherein the plurality of lighting devices are comprised in a luminaire.

12. The lighting system of claim 11, wherein the plurality of lighting devices are arranged along a longitudinal axis of the luminaire.

13. A method of providing a user interface on a user interface device, the user interface device for use in a lighting system comprising a plurality of lighting devices, each lighting device being repositionable by a user, and each lighting device comprising a motion sensor configured to detect a motion of the respective lighting device, the method comprising:

receiving one or more input signals indicative of motions of lighting devices of the plurality of repositionable lighting devices, determining which lighting device has been most recently repositioned based on the one or more input signals, rendering a plurality of virtual representations of the plurality of repositionable lighting devices on a display, and rendering an indication on the display indicating the lighting device that has been most recently repositioned.

14. A non-transitory computer program product for a computing device, the non-transitory computer program product comprising computer program code to perform the method of claim 13 when the non-transitory computer program product is run on a processing unit of the computing device.

* * * * *